(12) United States Patent
Mueller et al.

(10) Patent No.: US 11,092,221 B1
(45) Date of Patent: Aug. 17, 2021

(54) TORQUE CONVERTER WITH EXPANDED RADIUS COVER AND METHOD THEREOF

(71) Applicant: Schaeffler Technologies AG & Co. KG, Herzogenaurach (DE)

(72) Inventors: Rolf Mueller, Wooster, OH (US); Nigel Gurney, Wooster, OH (US); Mark Shrock, Orville, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/773,008

(22) Filed: Jan. 27, 2020

(51) Int. Cl.
*F16H 41/04* (2006.01)
*F16H 41/24* (2006.01)

(52) U.S. Cl.
CPC ....... *F16H 41/04* (2013.01); *F16H 2041/243* (2013.01)

(58) Field of Classification Search
CPC .......................... F16H 2041/243; F16H 41/04
See application file for complete search history.

(56) References Cited

U.S. PATENT DOCUMENTS

| 3,873,237 | A | * | 3/1975 | Tokunaga | F16D 33/18 416/180 |
| 7,284,645 | B2 | * | 10/2007 | Yamamoto | F16H 41/28 192/112 |
| 2002/0038546 | A1 | | 4/2002 | Yamanaka et al. | |
| 2007/0137962 | A1 | | 6/2007 | Sturgin et al. | |

* cited by examiner

*Primary Examiner* — F Daniel Lopez

(57) ABSTRACT

A torque converter, including: an impeller supported for rotation around an axis of rotation and including an impeller shell and at least one impeller blade non-rotatably connected to the impeller shell; a cover arranged to receive a rotational torque and including a distal portion including an interior surface in contact with the impeller shell, and an expanded radius portion extending from the distal portion in an axial direction and including an interior surface facing at least partly in a radially inner direction pointing toward the axis of rotation; and a turbine in fluid communication with the impeller and including a turbine shell and at least one turbine blade non-rotatably connected to the turbine shell. The interior surface of the expanded radius portion is located further in a radially outer direction than the interior surface of the distal portion.

14 Claims, 8 Drawing Sheets

US 11,092,221 B1

TORQUE CONVERTER WITH EXPANDED RADIUS COVER AND METHOD THEREOF

TECHNICAL FIELD

The present disclosure relates to a torque converter with an expanded radius cover and a method of fabricating a torque converter cover with an expanded radius.

BACKGROUND

Known torque converter covers lack a configuration enabling placement of extruded rivets as far as possible in a radially outer direction, while avoiding contact of a punch forming the extruded rivets with a non-planar surface of the cover. The contact of the punch with the non-planar surface results in excessive wear or damage to the punch and an extruded rivet non-parallel to an axis of rotation for the torque converter.

SUMMARY

According to aspects illustrated herein, there is provided a torque converter, including: an impeller supported for rotation around an axis of rotation and including an impeller shell and at least one impeller blade non-rotatably connected to the impeller shell; a cover arranged to receive a rotational torque and including a distal portion including an interior surface in contact with the impeller shell, and an expanded radius portion extending from the distal portion in a first axial direction parallel to the axis of rotation and including an interior surface facing at least partly in a radially inner direction, the radially inner direction orthogonal to the axis of rotation and pointing toward the axis of rotation; and a turbine in fluid communication with the impeller and including a turbine shell and at least one turbine blade non-rotatably connected to the turbine shell. The interior surface of the expanded radius portion is located further in a radially outer direction, opposite the radially inner direction, than the interior surface of the distal portion.

According to aspects illustrated herein, there is provided a torque converter, including: an impeller supported for rotation around an axis of rotation and including an impeller shell and at least one impeller blade non-rotatably connected to the impeller shell; a cover including a distal portion including a surface in contact with the impeller shell, a front portion facing at least partly in a first axial direction parallel to the axis of rotation, and an expanded radius portion connecting the distal portion with the front portion and including an interior surface facing at least partly in a radially inner direction, the radially inner direction orthogonal to the axis of rotation and pointing toward the axis of rotation; and a turbine in fluid communication with the impeller and including a turbine shell and at least one turbine blade non-rotatably connected to the turbine shell. An inner radius of the torque converter at the interior surface of the expanded radius portion is greater than an inner radius of the torque converter at the surface of the distal portion.

According to aspects illustrated herein, there is provided a method of forming a cover for a torque converter, including: forming the cover symmetrically around a central axis, the cover including a first section including a distal portion, the distal portion with an end surface facing at least partly in a first axial direction parallel to the central axis, and a front portion extending from the first section toward the central axis in a radially inner direction orthogonal to the central axis; blocking displacement of the cover in a radially outer direction opposite the radially inner direction, in the first axial direction, and in a second axial direction, opposite the first axial direction; contacting the distal portion with a forming ring; displacing the forming ring in the second axial direction; displacing, with the forming ring, the distal portion of the first section in the radially inner direction; and forming an expanded radius portion of the cover including a radially outwardly extending concave shape the expanded radius portion extending beyond the distal portion in the radially outer direction and connecting the front portion of the cover and the distal portion of the cover.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
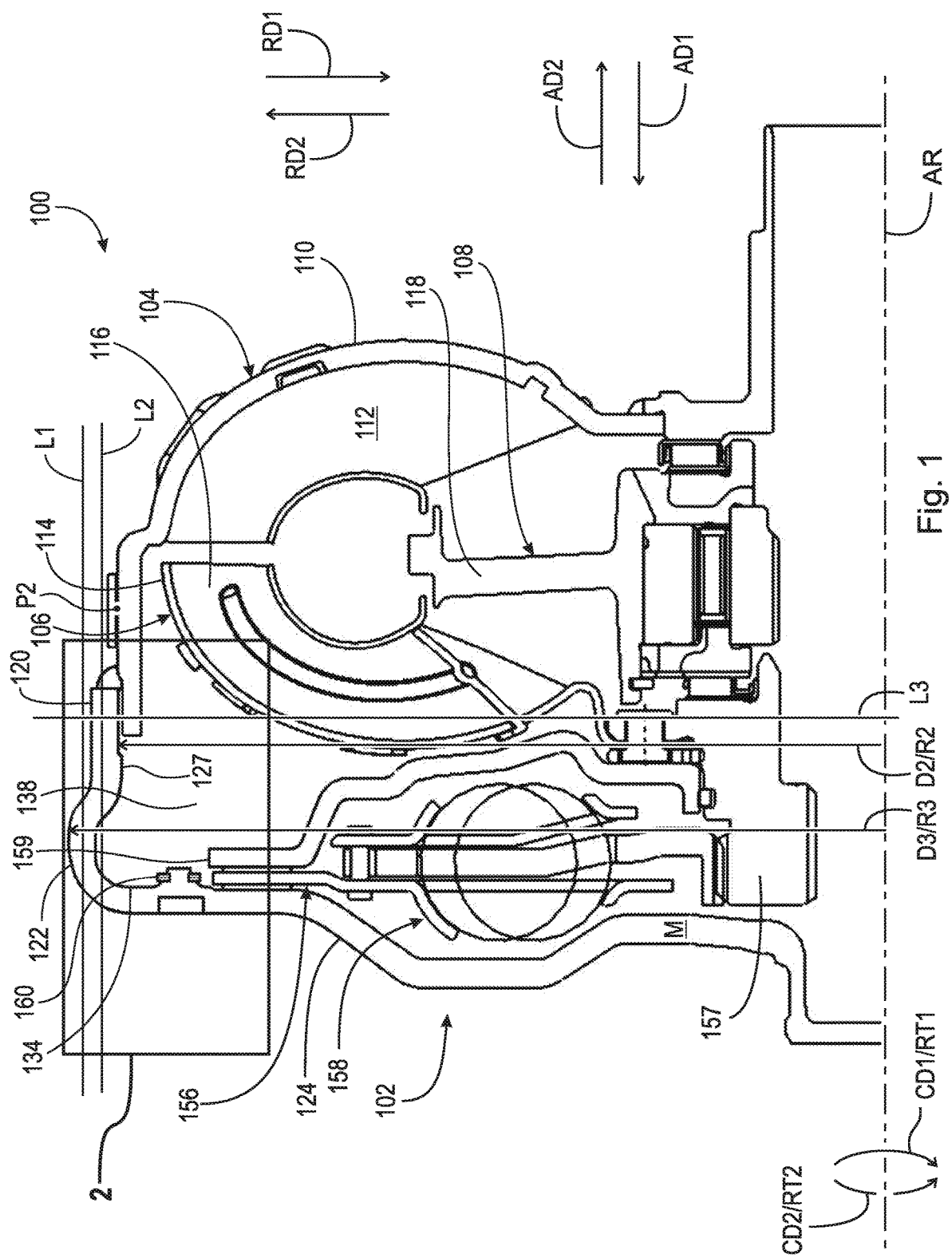
FIG. 1 is a partial cross-sectional view of a torque converter including a cover with an expanded radius.

FIG. 1 is a partial cross-sectional view of torque converter 100 including a cover with an expanded radius. Torque converter 100 includes: cover 102 supported for rotation around axis of rotation AR and arranged to receive rotational torque RT1 in circumferential direction CD1 or rotational torque RT2 in circumferential direction CD2 opposite direction CD1; impeller 104 supported for rotation around axis AR; turbine 106; and stator 108. Impeller 104 includes: impeller shell 110 non-rotatably connected to cover 102; and at least one impeller blade 112 non-rotatably connected to impeller shell 110. Turbine 106 is in fluid communication with impeller 104 and includes: turbine shell 114; and at least one turbine blade 116 non-rotatably connected to turbine shell 114. Stator 108 includes at least one stator blade 118 between impeller 104 and turbine 106.

Figure 2:
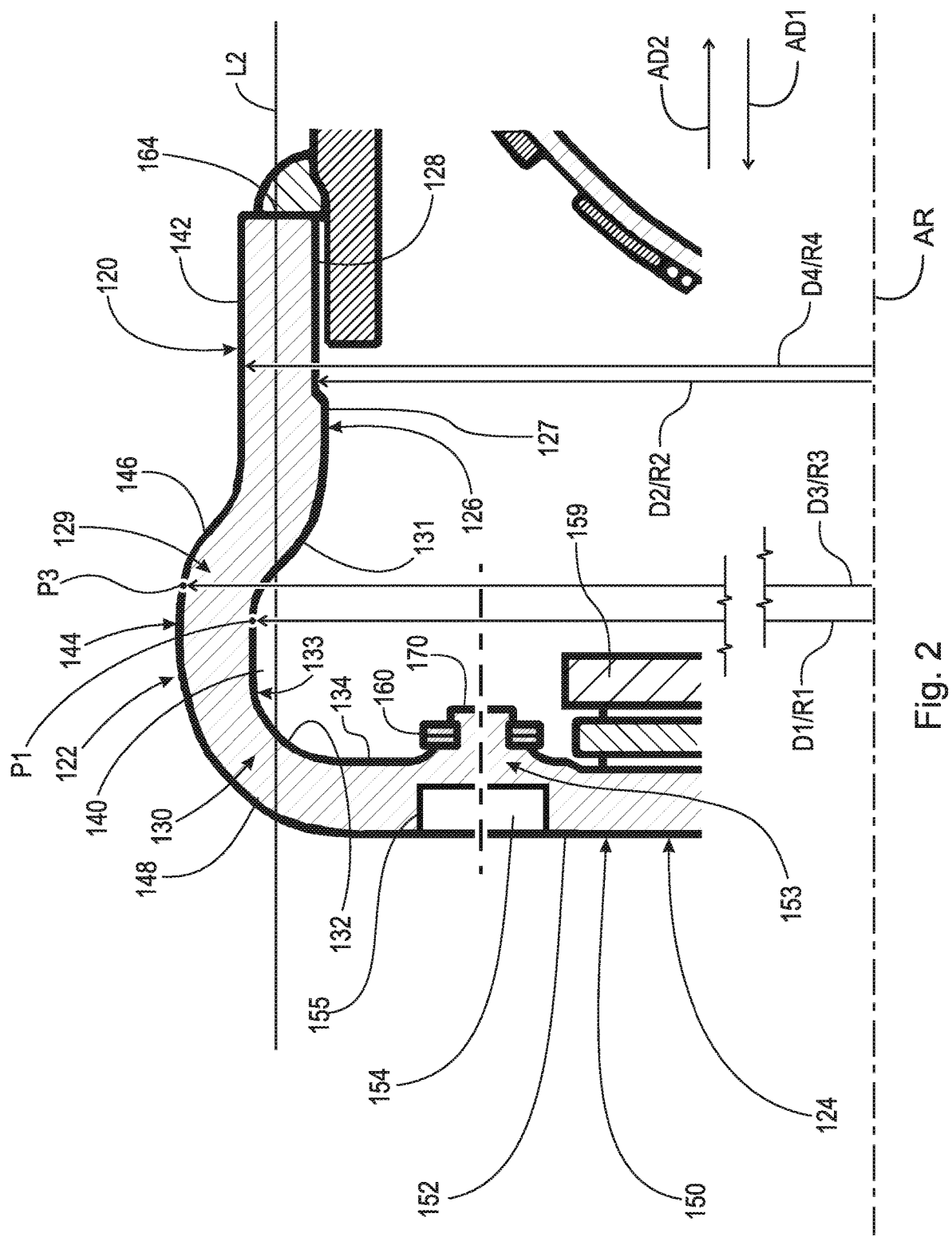
FIG. 2 is a detail of area 2 in FIG. 1.

FIG. 2 is a detail of area 2 in FIG. 1. The following should be viewed in light of FIGS. 1 and 2. Cover 102 includes: distal portion 120; expanded radius portion 122; and front portion 124. Front portion 124 faces at least partly in axial direction AD1, parallel to axis of rotation AR. Portion 120 includes interior surface 126, with segments 127 and 128. Segment 128 is in contact with impeller shell 110. In the example of FIG. 1, surface 126 has been machined so that segment 128 is radially outward of segment 127, to enable the connection of impeller shell 110 with cover 102. Surface 126 faces at least partly in radially inner direction RD1. Direction RD1 is orthogonal to axis AR and points toward axis AR. In an example embodiment, surface 126 is parallel to axis AR. Hypothetical line L1, in axial direction AD1, passes through expanded radius portion 122 and is outward of portion 120 in radially outer direction RD2. Direction RD2 is opposite direction RD1.

Expanded radius portion 122: connects portion 120 and portion 124; and includes curved segment 129 and curved segment 130. Curved segment 129 extends from portion 120 in axial direction AD1 and radially outer direction RD2 and includes interior surface 131 facing at least partly in radially inner direction RD1 and at least partly in axial direction AD1. Curved segment 130 extends from portion 124 in radially outer direction RD2 and in axial direction AD2, opposite direction AD1, and includes interior surface 132 facing at least partly in radially inner direction RD1 and at least partly in axial direction AD2. Surface 131 and 132 form interior surface 133 of portion 122. In an example embodiment, surface 131 is continuous with surface 126.

Surface 133 and curved segments 129 and 130 form a concave shape opening in direction RD1 and extending in radially outer direction RD2. Interior surface 133 is located further in radially outer direction RD2 than surface 126 and segment 128. For example, distance/inner radius D1/R1, in direction RD2 from axis AR to point P1 on surface 133 is greater than distance/inner radius D2/R2, in direction RD2, from axis AR to segment 128.

Surface 133, in particular surface 131, curves out and away from surface 126 in axial direction AD1 and in radially outer direction RD2. Front portion 124 includes planar interior surface 134. In an example embodiment, planar surface 134 is orthogonal to axis AR and faces in direction AD2. Surface 132 curves out and away from surface 134 in axial direction AD2, and in radially outer direction RD2. Surfaces 131 and 132 meet at point P1. Distance/inner radius D1/R1 is measured at portion P1. In an example embodiment, surfaces 131 and 132 directly connect surface 126 and surface 134. That is, there are no surfaces other than surfaces 131 and 132 between surface 134 and surface 126.

Hypothetical line L2, in axial direction AD1, passes through interior surface 133 and is located outward of surface 126 and segment 128 in radially outer direction RD2. Cover 102 and impeller shell 110 enclose space 138 in which turbine 106 is located. Surface 133 bounds portion 140 of space 138 in radially outer direction RD2 and in axial directions AD1 and AD2. Hypothetical line L2 passes through space 138, in particular, portion 140, and portion 120. Space 138, in particular portion 140 extends past radially outermost point P2 of impeller shell 110 in radially outer direction RD2. Line L2 is located past point P2 in direction RD2.

Hypothetical line L2 passes through in sequence, in axial direction AD2: curved portion 130; surface 132; space 138, in particular portion 140; surface 131; curved portion 129; and distal portion 120.

Portion 120 includes exterior surface 142 facing at least partly in radially outer direction RD2. Expanded radius portion 122 includes exterior surface 144: formed of a same piece of material M as cover 102 (for example, surface 144 is not formed by a piece of material connected to cover 102 and material M); and facing at least partly in radially outer direction RD2. Segment 129 includes exterior surface 146 curving outward from exterior surface 142 in axial direction AD1 and radially outer direction RD2. Segment 130 includes exterior surface 148 curving outward from exterior surface 150 of portion 124 in axial direction AD2 and radially outer direction RD2. Surface 150 faces at least partly in direction AD1. Surfaces 146 and 148 form surface 144 and meet at point P3. In an example embodiment, surface 146 is continuous with surface 142.

Surface 150 includes planar exterior section 152, which is the radially outermost section of surface 150. In an example embodiment, section 152 is orthogonal to axis AR. Surface 148 curves outward from section 152 in axial direction AD2 and radial direction RD2.

Exterior surface 144 is located further in radially outer direction RD2 than surface 142. For example, distance/outer radius D3/R3, in direction RD2 from axis AR to surface 144, at for example point P3, is greater than distance/outer radius D4/R4, in direction RD2 from axis AR to surface 142. Hypothetical line L3, in radially outer direction RD2, passes through impeller shell 110 and portion 120. Hypothetical line L1: passes through exterior surface 144; and passes through line L3 outward of portion 120 in direction RD2.

In an example embodiment, cover 102 includes extruded rivet 153 including extruded rivet indentation 154. Planar section 152 extends, in direction RD2, at least to radially outermost edge 155 of indentation 154. In an example embodiment, planar section 152 extends past edge 155 in direction RD2.

In an example embodiment, torque converter 100 includes: lock-up clutch 156; output hub 157 arranged to non-rotatably connect to a transmission input shaft (not shown); and torsional vibration damper 158. Lock-up clutch 156 includes piston plate 159 and leaf spring 160 connected to piston plate 159 and connected to cover 102 by rivets 153. Torque converter 100 is not limited to the components shown in FIG. 1.

FIGS. 3A through 3F illustrate a method of forming cover 102, with expanded radius portion 122, for torque converter 100. The following should be viewed in light of FIGS. 1 through 3F. The following describes a method of forming cover 102, with expanded radius portion 122, for torque converter 100. Although the method is presented as a sequence of steps for clarity, no order should be inferred from the sequence unless explicitly stated.

Figure 3A:
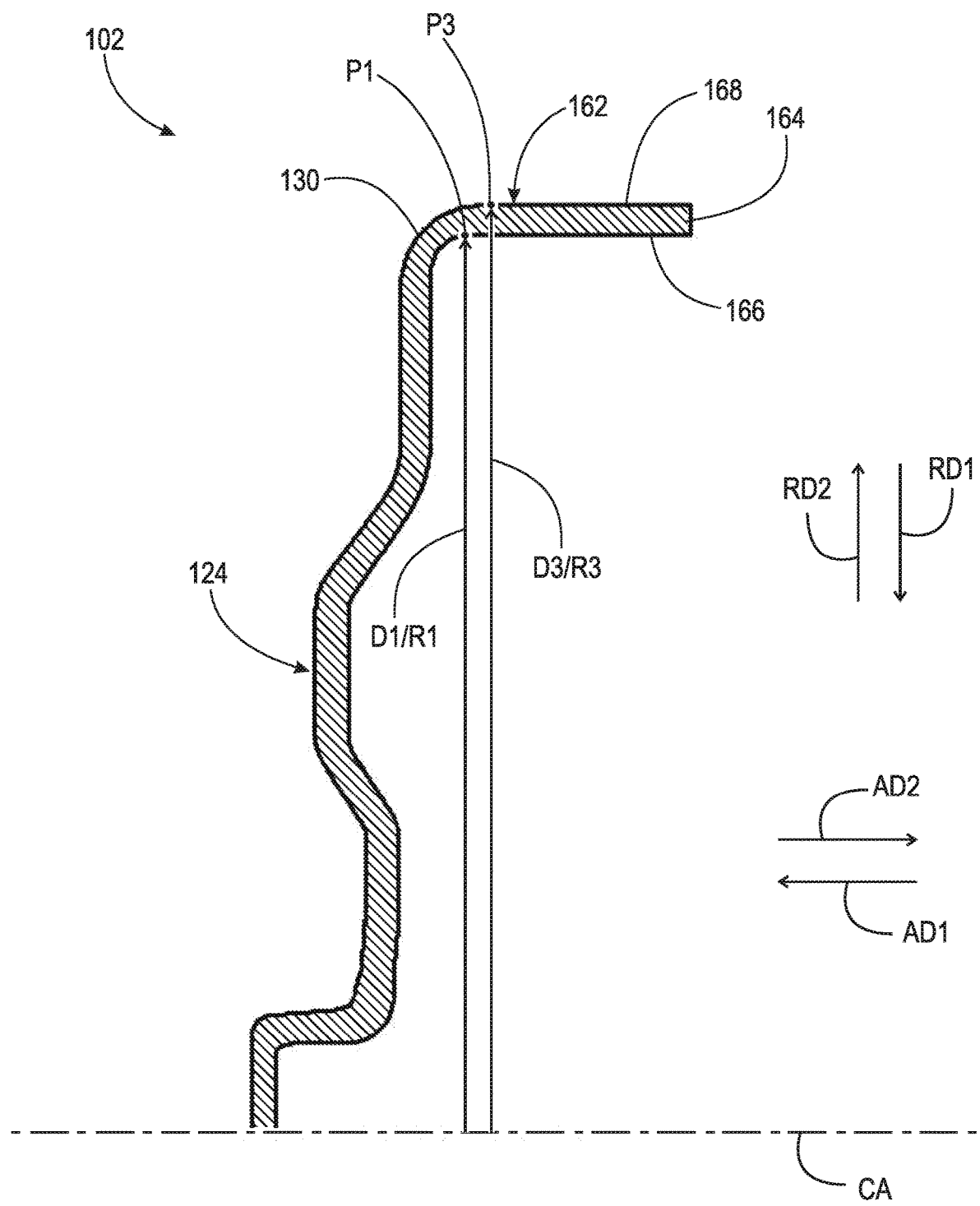
FIGS. 3A through 3F illustrate a method of forming a cover, with an expanded radius, for a torque converter.

As seen in FIG. 3A, a first step forms cover 102 symmetrically around central axis CA. Cover 102 includes: outer section 162 including end surface 164 facing in axial direction AD2 parallel to central axis CA; and front portion 124 extending from section 162 to central axis CA in radially inner direction RD1. Section 162 includes: interior surface 166, facing at least partly in radially inner direction RD1; and exterior surface 168, facing at least partly in radially outer direction RD2. Once cover 102 is installed in torque converter 100, axis AR and axis CA are co-linear.

Figure 3B:
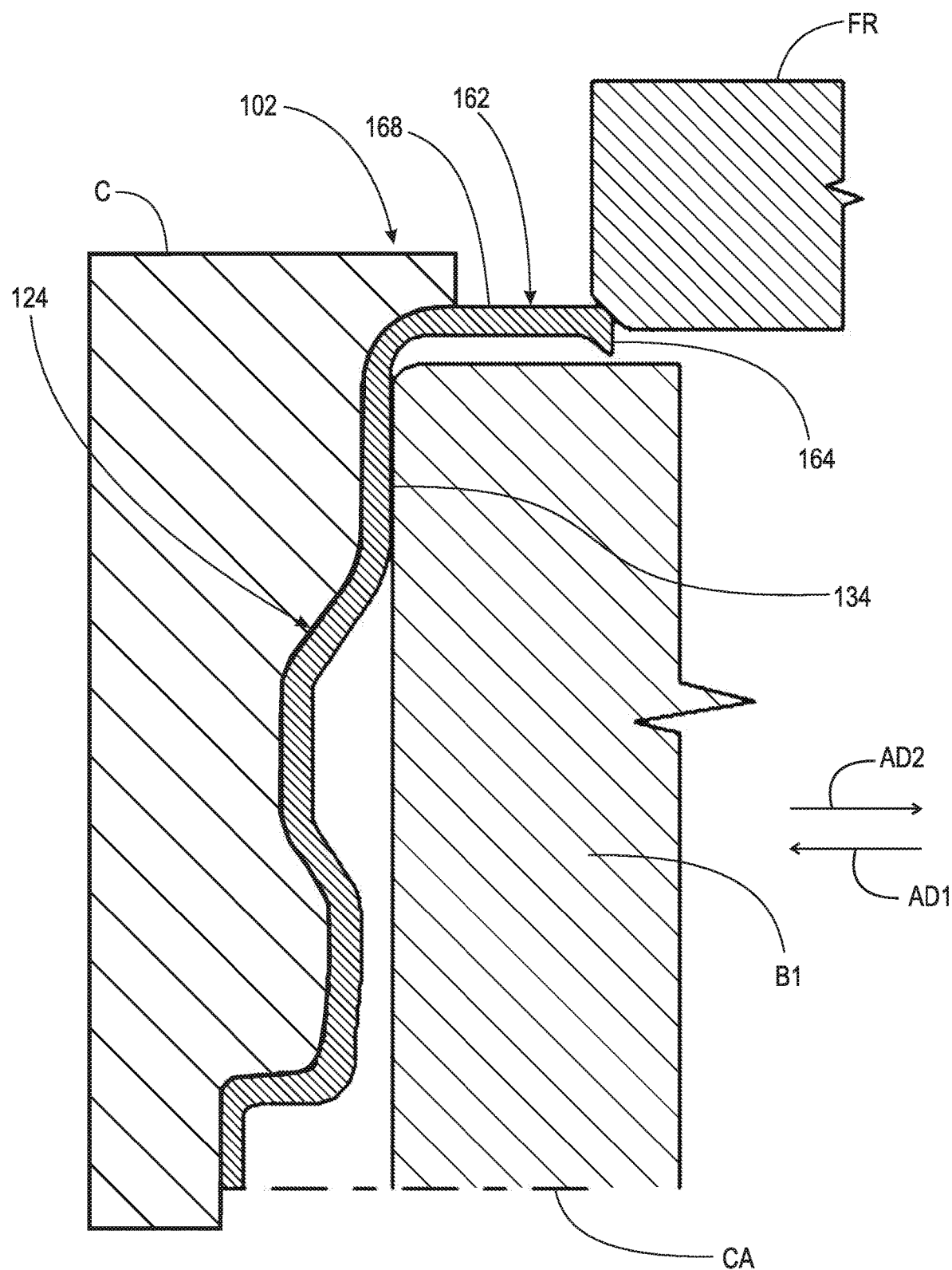

As seen in FIG. 3B, a second step: blocks displacement of cover 102 in axial directions AD1 and AD2, and in radially outer direction RD2. For example: cover 102 is placed in cradle C which conforms to the contours of cover 102 and which blocks displacement of cover 102 in direction AD1 and RD2; and block B1 is placed in contact with front portion 124 to sandwich and axially fix cover 102 between cradle C and block B1.

Figure 3C:
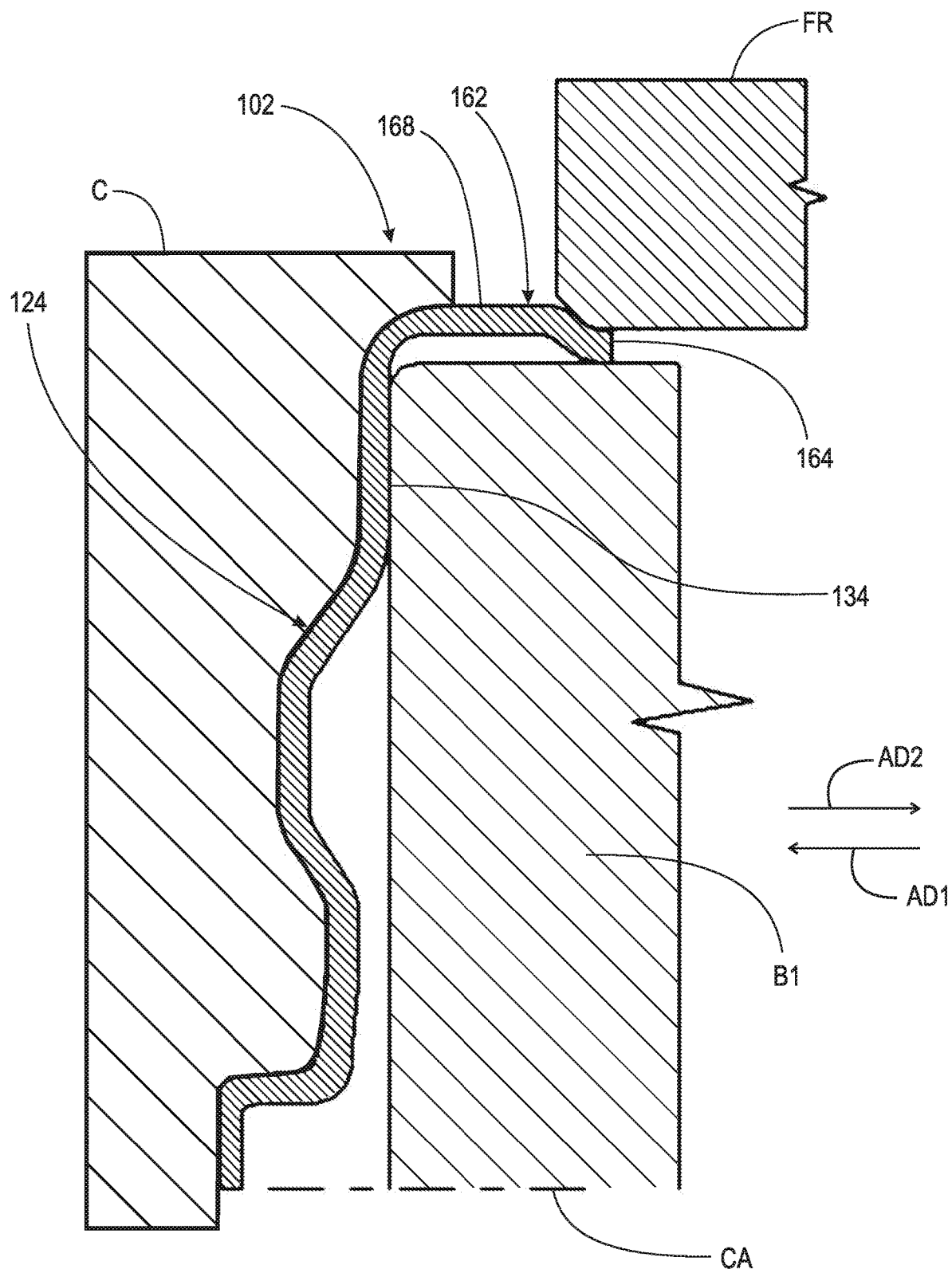
Figure 3D:
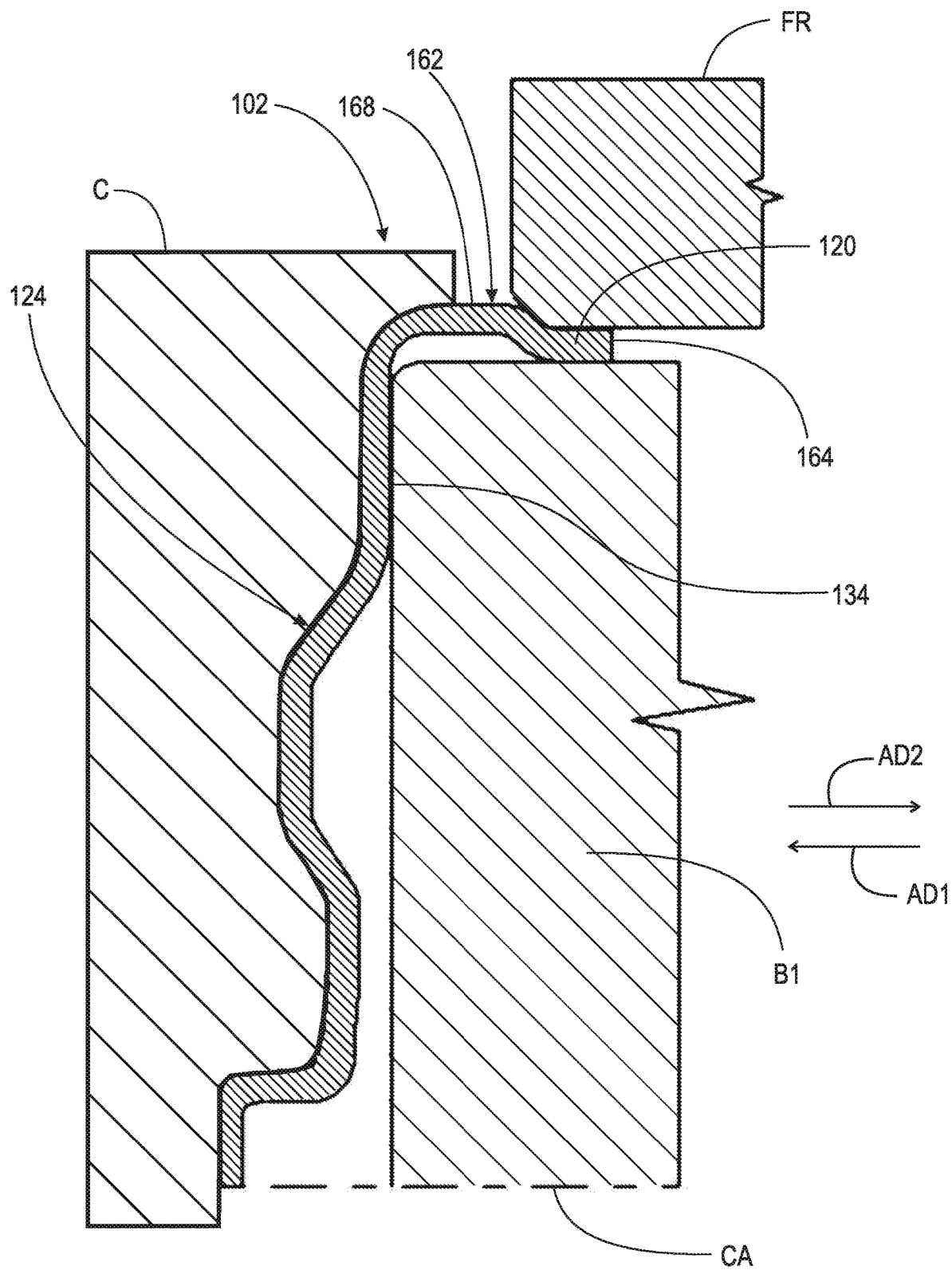
Figure 3E:
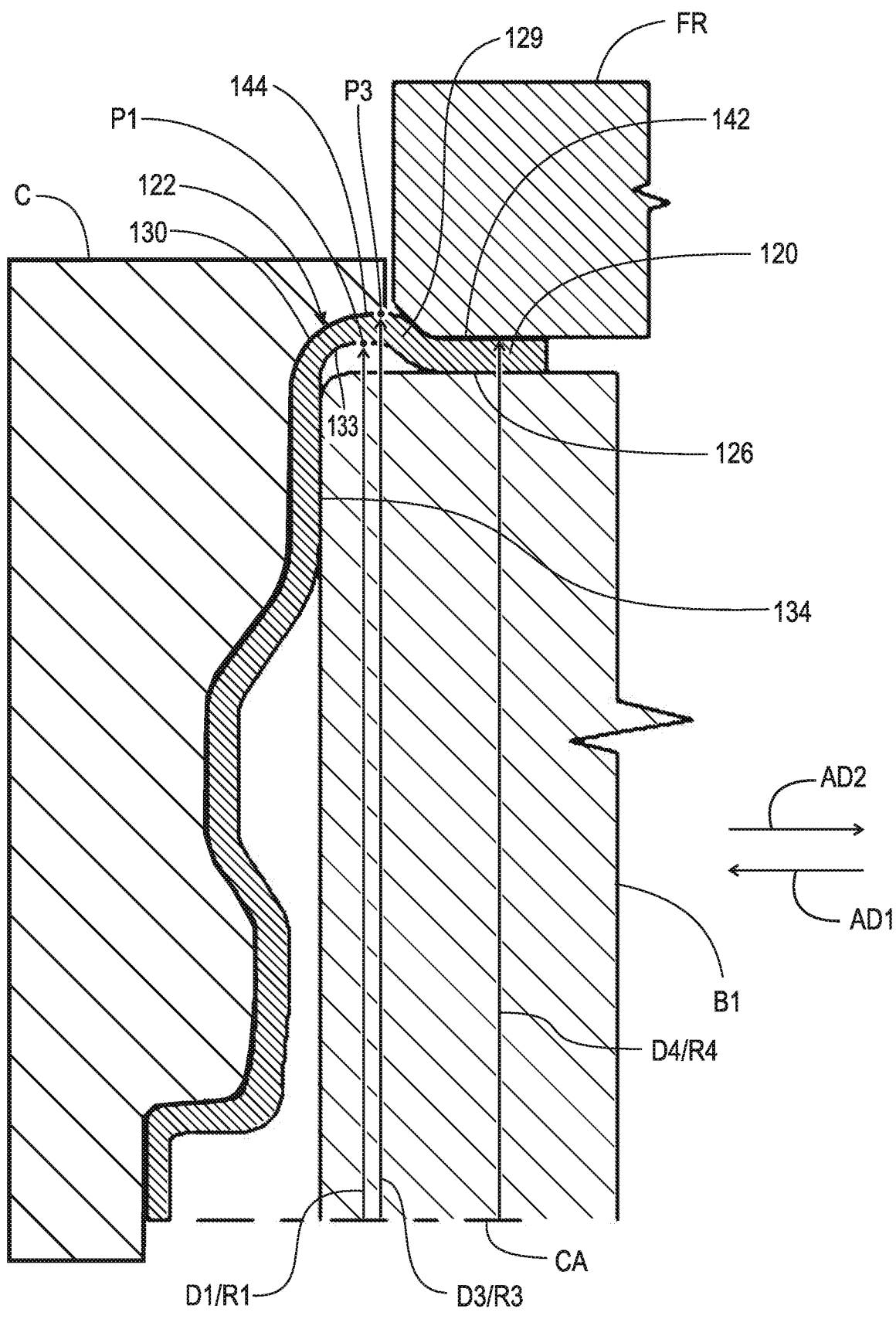

As seen in FIG. 3B: a third step contacts section 162 and surface 168 with forming ring FR. As seen in FIGS. 3C through 3E: a fourth step displaces forming ring FR in axial direction AD1 and with respect to section 162; a fifth step displaces, with forming ring FR, section 162 in radially inner direction RD1 to form portion 120; and a sixth step forms, with forming ring FR, expanded radius portion 122 with a radially outwardly extending concave shape. The concave shape extends beyond distal portion 120 in radially outer direction RD1 and connects front portion 124 of cover 102 and distal portion 120 of cover 102.

Figure 3F:
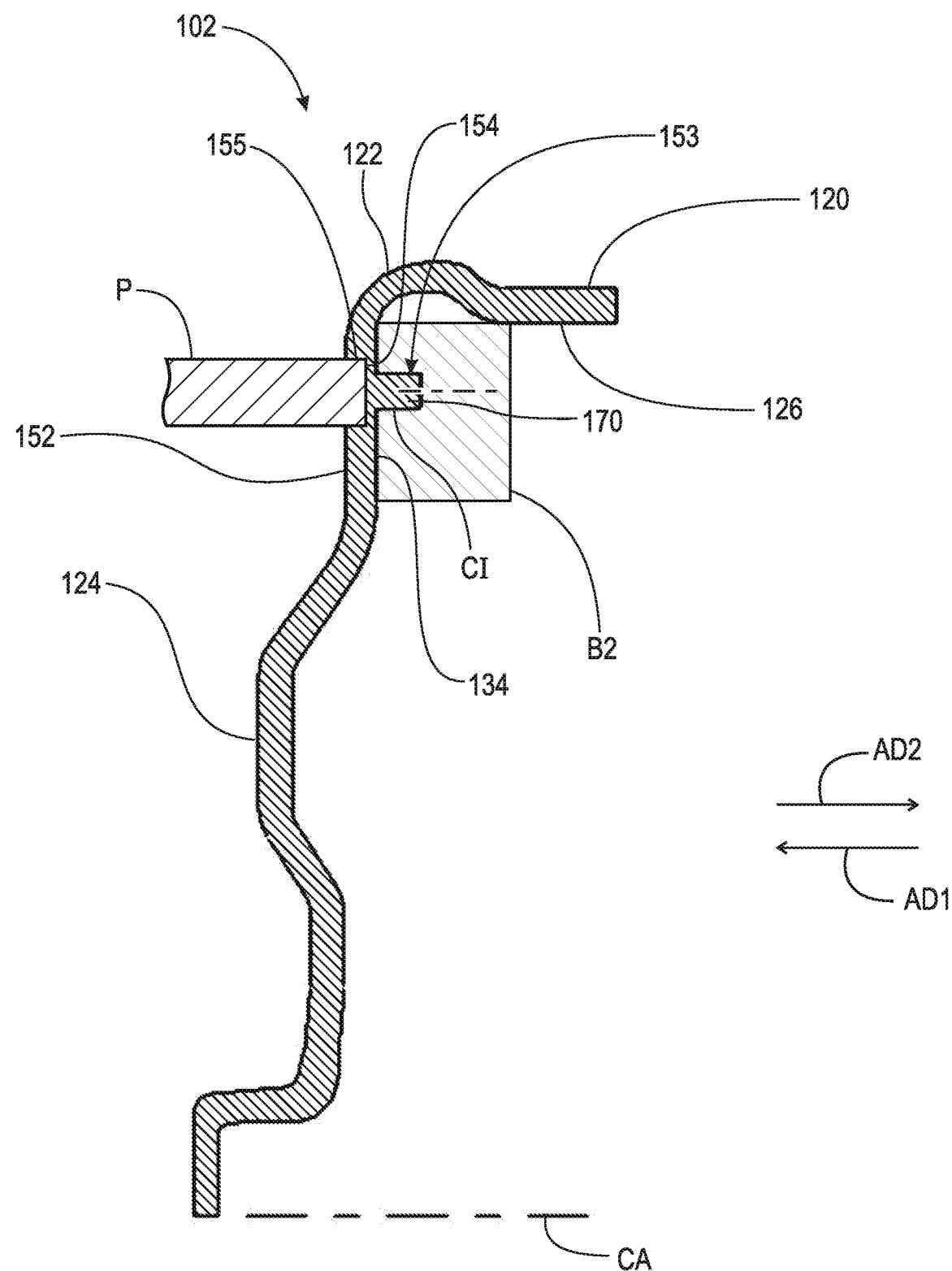

As seen in FIG. 3F, a seventh step: displaces punch P in axial direction ADZ; forms, with punch P, indentation 154 in planar section 152; and forms, with punch P, portion 170 of extruded rivet 153 extending from indentation 154 and beyond interior surface 134 of front portion 124. Planar section 152 extends, in radially outer direction RD2, to at least radially outmost edge 155 of indentation 154. For example, cradle C and block B1 are removed and block B2 with cylindrical indentation CI is placed against surface 134, blocking displacement of front portion 124 in direction AD2. Punch P is aligned with indentation CI and displaced in direction AD2 to displace material M, forming cover 102, in direction AD2, resulting in formation of indentation 154 and extrusion of portion 170 of rivet 153 into indentation CI.

The sixth step further includes: maintaining a radial position of interior surface 133 of expanded radius portion 122; and maintaining a radial position of exterior surface 144 of expanded radius portion 122. For example, radial distance/inside radius D1/R1 for surface 133, and radial distance/inside radius D3/R3 for surface 144 are each maintained from the first step to the sixth step.

The fifth step includes: displacing surface 168 radially inwardly to form surface 142 radially inward of exterior surface 144; and displacing surface 166 radially inwardly to form interior surface 126 radially inward of interior surface 133. Thus, distance/inner radius D4/R4 is less than distance/ inside radius D3/R3, in radially outer direction RD2, between central axis CA and point P1 on surface 133.

The first step includes forming curved segment 130 of cover 102 connecting front portion 124 and section 162. Forming expanded radius portion 122 of cover 102 in the sixth step includes: curving, with forming ring FR, section 162 between curved segment 130 and distal portion 120 in radially inner direction RD1 and in axial direction AD2 to form curved portion 129; and forming with curved portion 129 and curved segment 130, the concave shape extending in radially outer direction RD2 past exterior surface 142 of distal portion 120.

Cover 102, in particular expanded radius portion 122, enables locating extruded rivet 153 on cover 102 as far as possible in radially outer direction RD2, while enabling punch P to contact only planar section 152. The maximized radially outer positioning optimizes the torque-carrying capacity of components connected to rivets 153, for example lock-up clutch 156. Contacting only planar section 152 with punch P eliminates the problems noted above for known extruded rivets. Namely: ensuring that portion 170 of extruded rivet 153 is aligned in direction AD2 parallel to axis CA; and eliminating the imposition of unequal forces on punch P, which optimizes the service life of punch P and minimizes wear, maintenance, and repair of punch P.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

AD1 axial direction
AD2 axial direction
AR axis of rotation
B1 block
B2 block
C cradle
CA central axis
CD1 circumferential direction
CD2 circumferential direction
CI cylindrical indentation
D1/R1 radial distance/inside radius
D2/R2 radial distance/inside radius
D3/R3 radial distance/outside radius
D4/R4 radial distance/outside radius
FR forming ring
L1 line
L2 line
L3 line
M material, cover
P punch
P1 point on interior surface, cover
P2 point on exterior surface, impeller shell
P3 point on exterior surface, cover
RT1 rotational torque
RT2 rotational torque
RD1 radially inner direction
RD2 radially outer direction
100 torque converter
102 cover
104 impeller
106 turbine
108 stator
110 impeller shell
112 impeller blade
114 turbine shell
116 turbine blade
118 stator blade
120 distal portion
122 expanded diameter portion
124 front portion
126 interior surface, distal portion
127 segment, interior surface 126
128 segment, interior surface 126
129 curved segment, distal portion
130 curved segment, distal portion
131 interior surface, curved segment
132 interior surface, curved segment
133 interior surface, expanded diameter portion
134 planar interior surface, front section
138 space
140 portion, space
142 exterior surface, distal portion
144 exterior surface, expanded diameter portion
146 exterior surface, curved segment
148 exterior surface, curved segment
150 exterior surface, front portion
152 planar section, surface 150
153 extruded rivet
154 indentation, rivet
155 edge, indentation
156 lock-up clutch
157 output hub
158 torsional vibration damper
159 piston plate
160 leaf spring
162 outer section, cover
164 end surface, distal portion 166 interior surface, section 162
168 exterior surface, section 162
170 portion, extruded rivet

The invention claimed is:
1. A torque converter, comprising:
an impeller supported for rotation around an axis of rotation and including:
an impeller shell; and,
at least one impeller blade non-rotatably connected to the impeller shell;
a cover, formed of a single piece of material, arranged to receive a rotational torque and including:
a distal portion including an interior surface in contact with the impeller shell; and,
an expanded radius portion extending from the distal portion in a first axial direction parallel to the axis of rotation and including an interior surface facing at least partly in a radially inner direction, the radially inner direction orthogonal to the axis of rotation and pointing toward the axis of rotation; and,
a turbine in fluid communication with the impeller and including:
a turbine shell; and,
at least one turbine blade non-rotatably connected to the turbine shell, wherein:
the interior surface of the expanded radius portion is located further in a radially outer direction, opposite the radially inner direction, than the interior surface of the distal portion; and
the expanded radius portion forms a portion of the torque converter extending furthest in the radially outer direction.
2. The torque converter of claim 1, wherein the interior surface of the expanded radius portion curves from the interior surface of the distal portion in the first axial direction and in the radially outer direction.
3. The torque converter of claim 1, wherein a hypothetical line, in the first axial direction, passes through the interior surface of the expanded radius portion and is located outward of the interior surface of the distal portion in the radially outer direction.
4. The torque converter of claim 1, wherein:
the cover and the impeller shell enclose a space in which the turbine is located; and,
a hypothetical line, in the first axial direction, passes through the space and the distal portion.
5. The torque converter of claim 1, wherein the interior surface of the expanded radius portion is in a concave shape extending in the radially outer direction.
6. The torque converter of claim 5, wherein:
the cover and the impeller shell enclose a space in which the turbine is located;
the concave shape of the interior surface of the expanded radius portion bounds a portion of the space; and,
a hypothetical line, parallel to the axis of rotation, passes through the portion of the space and the distal portion of the cover.
7. The torque converter of claim 5, wherein:
the cover and the impeller shell enclose a space in which the turbine is located;
the concave shape of the interior surface of the expanded radius portion bounds a portion of the space; and,
a hypothetical line, parallel to the axis of rotation passes through in sequence: the interior surface of the expanded radius portion, the portion of the space, and the interior surface of the expanded radius portion.

8. The torque converter of claim 1, wherein:
the distal portion of the cover includes an exterior surface facing at least partly in the radially outer direction; and,
the expanded radius portion includes an exterior surface, the exterior surface of the expanded radius portion:
continuous with the exterior surface of the distal portion; and,
curving outward from the exterior surface of the distal portion in the first axial direction and in the radially outer direction.
9. The torque converter of claim 1, wherein:
the expanded radius portion includes an exterior surface facing at least partly in the radially outer direction;
the cover includes a planar exterior surface, the planar exterior surface continuous with the exterior surface of the expanded radius portion and orthogonal to the axis of rotation;
the cover includes an extruded rivet indentation in the planar exterior surface; and,
the planar exterior surface extends, in the radially outer direction, at least to a radially outermost edge of the extruded rivet indentation.
10. The torque converter of claim 1, wherein:
the distal portion of the cover includes an exterior surface facing at least partly in the radially outer direction;
the expanded radius portion includes an exterior surface, the exterior surface of the expanded radius portion:
continuous with the exterior surface of the distal portion.
11. A torque converter, comprising:
an impeller supported for rotation around an axis of rotation and including:
an impeller shell; and,
at least one impeller blade non-rotatably connected to the impeller shell;
a cover, formed of a single piece of material, including:
a distal portion including a surface in contact with the impeller shell;
a front portion facing at least partly in a first axial direction parallel to the axis of rotation; and,
an expanded radius portion connecting the distal portion with the front portion and including an interior surface facing at least partly in a radially inner direction, the radially inner direction orthogonal to the axis of rotation and pointing toward the axis of rotation; and,
a turbine in fluid communication with the impeller and including:
a turbine shell; and,
at least one turbine blade non-rotatably connected to the turbine shell, wherein:
an inner radius of the torque converter at the interior surface of the expanded radius portion is greater than an inner radius of the torque converter at the surface of the distal portion; and,
the expanded radius portion forms a portion of the torque converter extending furthest in a radially outer direction, opposite the radially inner direction.
12. The torque converter of claim 11, wherein the interior surface of the expanded radius portion curves from the surface of the distal portion:
in the first axial direction; and,
in a radially outer direction opposite the radially inner direction.
13. The torque converter of claim 11, wherein:
the cover and the impeller shell enclose a space in which the turbine is located;

the impeller shell includes a radially outermost point; and, the space extends further in a radially outer direction, opposite the radially inner direction, than the radially outermost point of the impeller shell.

14. The torque converter of claim 11, wherein:

the interior surface of the expanded radius portion is in a concave shape extending in a radially outer direction opposite the radially inner direction;

the cover and the impeller shell enclose a space in which the turbine is located;

the concave shape of the interior surface of the expanded radius portion bounds a portion of the space; and, a hypothetical line, parallel to the axis of rotation, passes through the portion of the space and the distal portion of the cover.

\* \* \* \* \*